United States Patent
Kim et al.

(10) Patent No.: US 7,842,416 B2
(45) Date of Patent: Nov. 30, 2010

(54) RECHARGEABLE BATTERY HAVING A CAP ASSEMBLY

(75) Inventors: Jae-Kyung Kim, Suwon-si (KR);
Sang-Eun Cheon, Suwon-si (KR);
Seok-Yoon Yoo, Suwon-si (KR);
Hye-Won Yoon, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1524 days.

(21) Appl. No.: 11/168,926

(22) Filed: Jun. 29, 2005

(65) Prior Publication Data

US 2005/0287434 A1 Dec. 29, 2005

(30) Foreign Application Priority Data

Jun. 29, 2004 (KR) ................ 10-2004-0049417

(51) Int. Cl.
*H01M 2/00* (2006.01)
*H01M 2/02* (2006.01)
*H01M 2/08* (2006.01)

(52) U.S. Cl. .................. 429/183; 429/163; 429/178; 429/180; 429/181

(58) Field of Classification Search .......... 429/163, 429/178, 180, 181, 183
See application file for complete search history.

(56) References Cited

U.S. PATENT DOCUMENTS

| | | | | |
|---|---|---|---|---|
| 3,769,095 A | * | 10/1973 | Schmidt | ............ 429/151 |
| 3,964,934 A | * | 6/1976 | Ching et al. | .......... 429/178 |
| 4,164,609 A | * | 8/1979 | Jensen | .......... 429/183 |
| 5,704,501 A | * | 1/1998 | Valyi | ............. 215/232 |
| 6,579,640 B1 | * | 6/2003 | Nagase et al. | .......... 429/54 |
| 2003/0186120 A1 | * | 10/2003 | Wang et al. | .......... 429/178 |

FOREIGN PATENT DOCUMENTS

| | | |
|---|---|---|
| JP | 5466122 | 5/1979 |
| JP | 52-155931 | 12/1997 |
| JP | 10-302760 | 11/1998 |
| JP | 11-329476 | 11/1999 |
| JP | 2001-135300 | 5/2001 |
| JP | 2001-332264 | 11/2001 |
| JP | 2003-197177 | 7/2003 |

* cited by examiner

*Primary Examiner*—Dah-Wei D Yuan
*Assistant Examiner*—Steven Scully
(74) *Attorney, Agent, or Firm*—H.C. Park & Associates, PLC

(57) ABSTRACT

The rechargeable battery comprises an electrode assembly including a positive electrode, a negative electrode, and a separator interposed between those two electrodes. The battery further comprises a container that receives the electrode assembly inside it and a cap assembly that is coupled with the container to seal it. The cap assembly includes a cap plate that is coupled with the container, an external terminal that is disposed in the cap plate to be coupled with to the electrode assembly, and a tubular body that surrounds the external terminal to fix the external terminal to the cap plate.

18 Claims, 3 Drawing Sheets

RECHARGEABLE BATTERY HAVING A CAP ASSEMBLY

CROSS REFERENCE TO RELATED APPLICATION

This application claims priority to and the benefit of Korean Patent Application No. 10-2004-0049417, filed on Jun. 29, 2004, which is hereby incorporated by reference for all purposes as if fully set forth herein.

BACKGROUND OF THE INVENTION (a) Field of the Invention

The present invention relates to an assembly structure of an external terminal for a rechargeable battery.

(b) Description of the Related Art

Unlike nonrechargeable batteries, rechargeable batteries may be recharged. Non-aqueous electrolyte rechargeable batteries with high energy density have recently been developed as high power rechargeable batteries. Lower power batteries in which battery cells are made into a battery pack are used as the power source for various portable electronic devices such as cellular phones, laptop computers, and camcorders. Larger battery packs which are formed by connecting several to tens of the rechargeable battery cells may be suitable for motor driven devices such as the electric vehicles.

Rechargeable batteries may be classified into different categories based on external shape such as for example, rectangular box and cylindrical shapes. The rechargeable battery includes an electrode assembly in which a long rectangular-shaped positive plate, a long rectangular-shaped negative plate, and a separator that is interposed between the plates are spiral-wound together. Alternatively, a positive plate, a negative plate, and a separator may be stacked in a multiple layer structure. The electrode assembly is inserted into a container, and a cap assembly is mounted on the container to form the battery.

The cap assembly of such rechargeable batteries has an external terminal that is coupled with the electrode assembly which is fixed to the container by welding, etc. to seal the container.

Generally, the external terminal of the cap assembly is inserted into a hole that is formed on the cap plate of the cap assembly. Then, a packing and an O-ring are disposed between the hole and the external terminal to provide electrical insulation and a tight fit.

The external terminal is coupled with the cap plate by a nut that is fastened to a screw thread that is formed on the outer circumference of the external terminal. The packing and O-ring are pressed by the tightness of the nut to seal the hole.

However, the above sealing structure and installation of the external terminal is problematic because it requires many parts which raises the manufacturing cost, and complicates the manufacturing process to decrease the manufacturing efficiency.

SUMMARY OF THE INVENTION

The present invention provides a rechargeable battery in which the assembly structure of the cap plate and the external terminal are improved to reduce time and simplify the assembly process.

Additional features of the invention will be set forth in the description which follows, and in part will be apparent from the description, or may be learned by practice of the invention.

The present invention discloses a rechargeable battery comprising an electrode assembly including a positive electrode, a negative electrode, and a separator interposed between the two electrodes. The battery further comprises a container for receiving the electrode assembly inside and a cap assembly that is fixed to the container. The cap assembly includes a cap plate that is fixed to the container, an external terminal that is disposed in the cap plate to be coupled with the electrode assembly, and a tubular body that surrounds the external terminal to fix the external terminal to the cap plate.

The present invention also discloses a method for manufacturing a rechargeable battery comprising the steps of integrally forming a tubular body with a cap plate of a cap assembly to be assembled with an external terminal, inserting the external terminal into the tubular body, and press molding the tubular body from the outside of the tubular body whereby the tubular body closely contacts the external terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

According to the present invention, the external terminal may easily be mounted in the cap assembly to reduce time and simplify the assembly of the external terminal.

In addition, the connection between the external terminal and the cap assembly is improved to enhance the battery power. Moreover, the number of parts necessary for assembling the external terminal and maintaining the tightness can be reduced to reduce the manufacturing cost of the rechargeable battery.

The rechargeable battery of the present invention may be used as the power source for high power motor driven devices such as hybrid electric vehicles, electric vehicles, wireless vacuum cleaners, motorbikes, or motor scooters.

The following description refers to a rectangular-box shaped rechargeable battery with a positive terminal and a negative terminal that are formed on a cap plate of a cap assembly as external terminals. However, the present invention is not limited to the structure described below and other shapes such as cylindrical, etc may be used.

Figure 1:
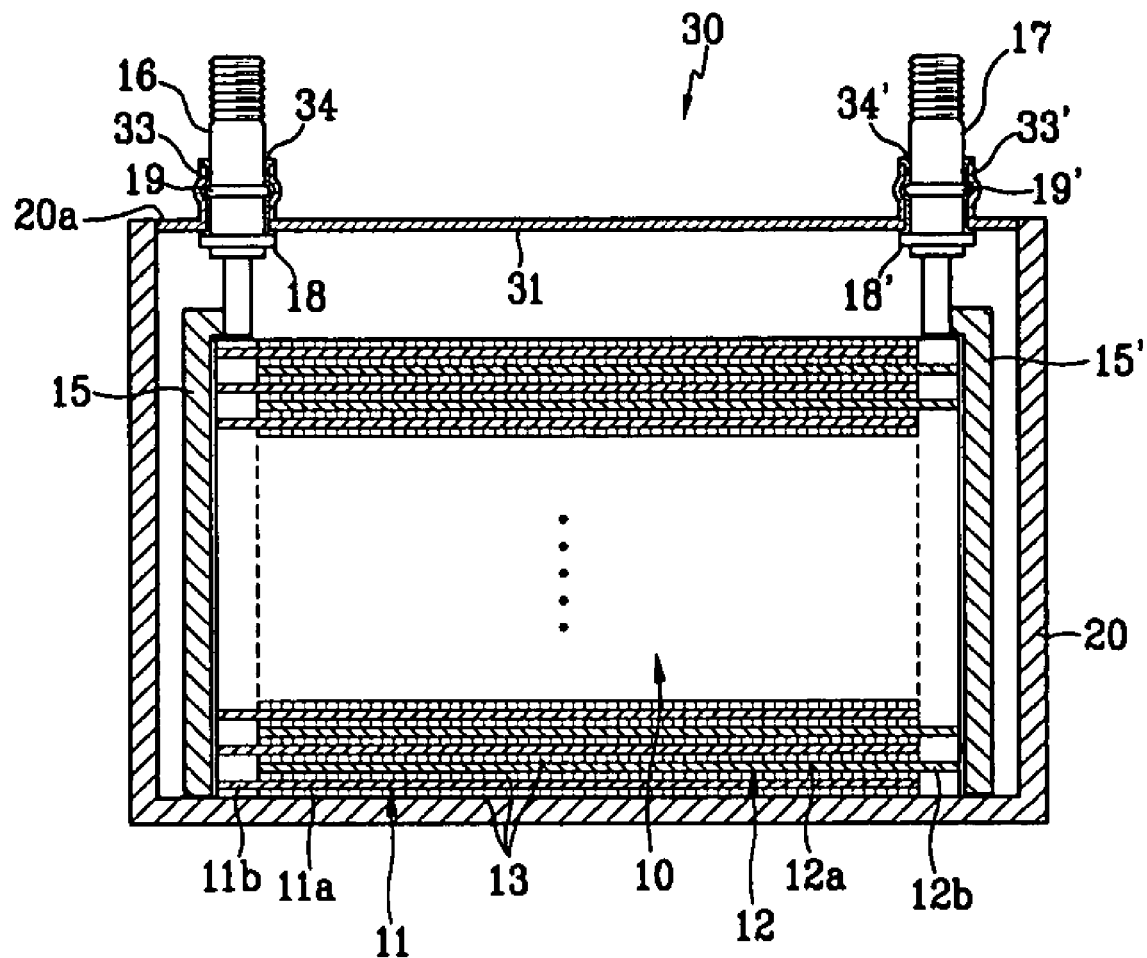
FIG. 1 is a schematic cross sectional view of a rechargeable battery according to a first embodiment of the present invention.

As shown in FIG. 1, the rechargeable battery of the present embodiment includes an electrode assembly 10 having a positive electrode 11, a negative electrode 12, and a separator 13 interposed between the two electrodes, a container 20 having a space to receive the electrode assembly 10 inside the container, and a cap assembly 30 that is mounted on an opening 20a of the container 20.

The cap assembly 30 includes a cap plate 31 that is mounted on the opening 20a of the container 20 to seal it. The cap assembly also includes a positive terminal 16 and a negative terminal 17 that are coupled with the positive electrode 11 and the negative electrode 12, respectively, through lead elements 15 and 15' and are assembled with the cap plate 31 to expose a portion thereof outside the container 20.

The positive terminal 16 and the negative terminal 17 are inserted into a through hole 32 that is formed on the cap plate 31. Tubular bodies 33 and 33' into which the positive terminal 16 and the negative terminal 17 are inserted are formed around the through hole 32 in the cap plate 31.

The tubular bodies 33 and 33' have an inner space with a planar cross section that is the same as the planar cross section of the positive terminal 16 and the negative terminal 17. The tubular bodies 33 and 33' closely contact both terminals 16 and 17 to couple them with the cap plate 31. The tubular bodies 33 and 33' are integrally formed with the cap plate 31 and have a cylindrical shape since the positive terminal 16 and the negative terminal 17 have planar cross sections with a round shape.

The container 20 may comprise, but is not limited to a conductive metal such as aluminum, an aluminum alloy, and steel plated with nickel. The container 20 may have a rectangular box shape that has an inner space to receive the electrode assembly 10.

The electrode assembly 10 has a jellyroll structure such that the positive electrode 11 and the negative electrode 12 comprised of collectors 11a and 12a that are coated with a positive active material and a negative active material, respectively, and the separator 13 that is interposed between them are stacked in a multiple layer structure and are then wound into a jellyroll configuration.

The positive electrode 11 and the negative electrode 12 have uncoated regions 11b and 12b respectively that are not coated with the active materials along one edge of each of the collectors 11a and 12a.

The uncoated regions 11b and 12b are arranged to face each other when assembling the electrode assembly 10. The positive uncoated region 11b is coupled with a lead element 15 that contacts a positive external terminal 16. The negative uncoated region 12b is coupled with a lead element 15' that contacts a negative external terminal 17.

The tubular bodies 33 and 33' protrude a predetermined height from the outer surface of the cap plate 31 to the outside of the container 20. The inside diameter of the tubular bodies 33 and 33' are preferably sized to insert the terminals 16 and 17 therein. There is no limitation on the thickness of the tubular bodies if they are pressed by a press (P) that reduces their inside diameters so that their inner circumferential surfaces may closely contact the outer circumferential surfaces of the terminals 16 and 17.

The positive terminal 16 and the negative terminal 17 have screw threads in their upper portions which pass through the tubular bodies 33 and 33' and are exposed to the outside. The screw threads are formed to fasten connectors (not shown) that couple multiple rechargeable batteries by the screw connections to form a battery module.

The terminals 16 and 17 also have flanges 18 and 18' in their lower portions that are positioned inside the container 20. The flanges 18 and 18' closely contact the lower surface of the cap plate 31 to prevent separation of the terminals 16 and 17 from the cap plate 31.

In addition, ring-shaped protrusions 19 and 19' are formed along the outer circumferential surfaces of the terminals 16 and 17 in the portion that contacts the tubular bodies 33 and 33'. The cross sections of the protrusions 19 and 19' along the length of the terminals 16 and 17 have a hemisphere shape.

When the press (P) presses the tubular bodies 33 and 33' to the terminals 16 and 17 respectively, the protrusions 19 and 19' allow the inner circumferential surfaces of the tubular bodies 33 and 33' to be pressed and more closely contact the outer circumferential surface of the terminals 16 and 17, thus enhancing the connection between two members. Furthermore, the protrusions 19 and 19' prevent separation of the terminals 16 and 17 from the tubular bodies 33 and 33'.

A sealing member may be disposed between the inner circumferential surfaces of the tubular bodies 33 and 33' and the terminals 16 and 17 to maintain a tight connection. In the present embodiment, the sealing member is comprised of gaskets 34 and 34'. The gaskets 34 and 34' may have a cylindrical shape like the tubular bodies 33 and 33' and may closely contact the inner circumferential surface of the tubular bodies 33 and 33'.

Figure 2:
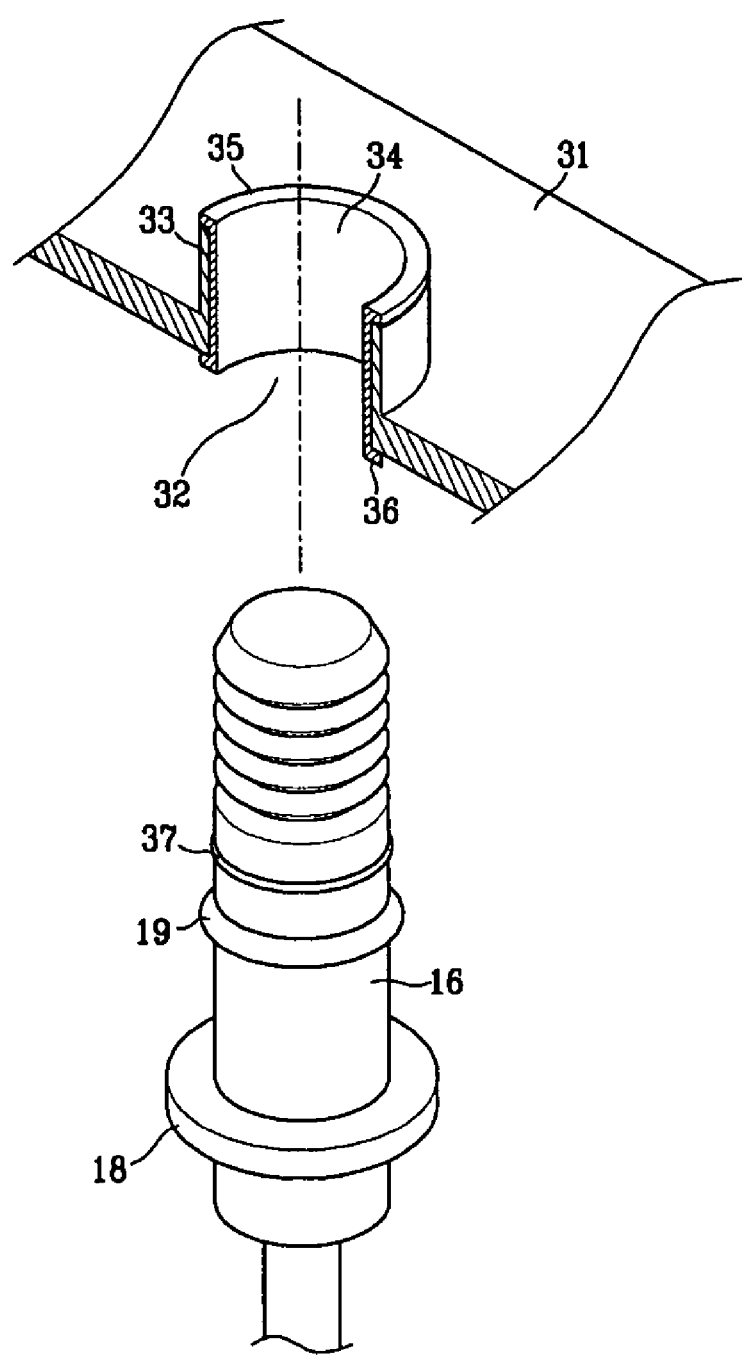
FIG. 2 is a partially cut cross sectional view of the structure before a cap assembly is assembled with an external terminal of the rechargeable battery according to the first embodiment of the present invention.
Figure 3:
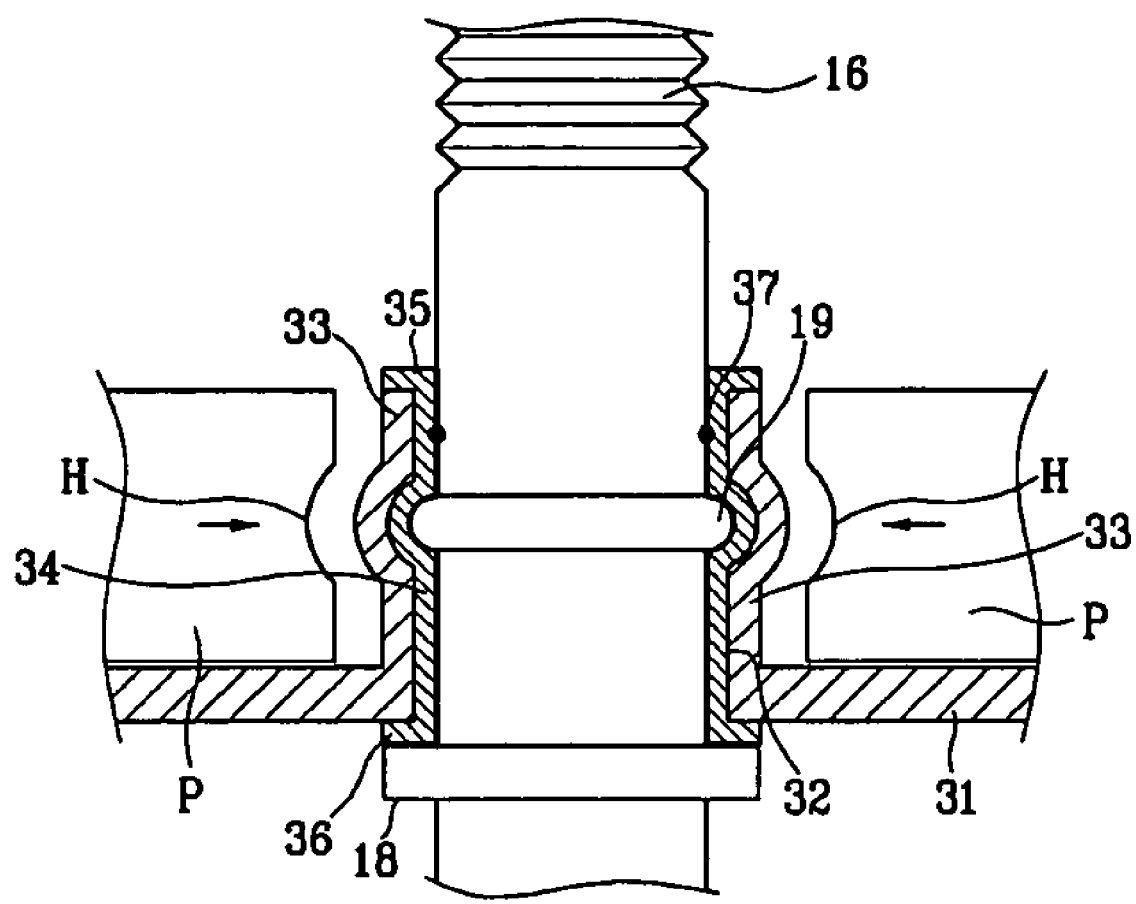
FIG. 3 is a cross sectional view of the structure after the cap assembly is assembled with the external terminal of the rechargeable battery according to the first embodiment of the present invention.

Flanges 35 and 36 are formed on the upper end and the lower end of the gaskets 34 and 34', respectively. When the gaskets 34 and 34' are inserted into the tubular bodies 33 and 33', the upper end flange 35 is mounted on the upper end of the tubular bodies 33 and 33', and the lower end flange 36 is mounted on the inner surface of the cap plate 31 after fitting through the through hole 32 of the cap plate 31 (FIG. 2 and FIG. 3). The flanges 35 and 36 may further the contact between the tubular bodies 33 and 33' and the terminals 16 and 17 as well.

When the terminals 16 and 17 are assembled with the tubular bodies 33 and 33', the gaskets 34 and 34' closely contact the inner circumferential surfaces of the tubular bodies 33 and 33' to more tightly maintain the contact between the terminals 16 and 17 and the tubular bodies 33 and 33'.

Also, when the tubular bodies 33 and 33' are press molded by the press (P) as described above, the gaskets 34 and 34' conform to the shape of the protrusions 19 and 19' that are formed on the terminals 16 and 17 to be closely contacted with the terminals 16 and 17.

The protrusions 19 and 19' that are formed on the surface of the terminals 16 and 17 maintain the tightness between the terminals 16 and 17 and the tubular bodies 33 and 33' respectively, and prevent movement of the terminals 16 and 17 in the tubular bodies 33 and 33', together with the flanges 35 and 36 of the gaskets 34 and 34'.

The sealing member may comprise a polymer resin and may be formed by injecting liquid polymer resin between the terminals 16 and 17 and the tubular bodies 33 and 33' and then curing the resin. This may remove air between the tubular bodies 33 and 33' and the terminals 16 and 17 to achieve a tight seal.

The following describes how to assemble the terminals 16 and 17 with the tubular bodies 33 and 33'. FIG. 2 is a cross sectional view of the structure before the tubular body 33 is assembled with the terminal 16. FIG. 3 is a partial cross sectional view of the structure after the tubular body 33 is assembled with the terminal 16.

In the present embodiment, the positive terminal 16 and the negative terminal 17 have the same shape and they are inserted into tubular bodies 33 and 33' of the same shape. Thus, FIG. 2 and FIG. 3 show only the structure of the positive terminal 16.

The terminal 16 is installed in the cap assembly 30 by the following process. The gasket 34 is inserted into the inner surface of the tubular body 33 which is integrally formed with the through hole 32 of the cap plate 31. Then the terminal 16 is inserted into the inside of the tubular body 33 (FIG. 2). After the terminal 16 is completely inserted into the tubular body 33 and the flange 18 that is formed on the lower end of the terminal 16 contacts the lower end flange 36 of the gasket 34, the tubular body 33 is press molded from its outside surface toward the terminal 16 by operating the press (P) as shown in FIG. 3.

The press (P) has a groove (H) that corresponds to the protrusion 19 at the outer circumferential surface of the terminal 16. Accordingly, when the tubular body 33 is pressed by the press (P), the tubular body 33 is press molded to have the same shape as the terminal 16 including a protruding portion that corresponds to the protrusion 19.

As described above, the tubular body 33 is pressed toward the terminal 16 to conform to and closely contact the terminal 16 through the gasket 34. The pressure that is generated from the above couples the terminal 16 to the tubular body 33, which enables the terminal 16 to be fixed to the cap assembly 30.

In addition, an O-ring 37 may be provided to the outer circumferential surface of the terminal 16 to enhance the tightness as shown in FIG. 3.

When the O-ring 37 is provided in the terminal 16, the O-ring 37 may be disposed above the protrusion 19, but there is no limitation to its position. The O-ring 37 may be formed anywhere in the outer circumferential surface of the terminal 16 to contact the tubular body 33, and more than one O-ring may be formed along the length direction of the tubular body 33. The structure of the O-ring 37 may be the same as that of any workable O-ring.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
   an electrode assembly including a positive electrode, a negative electrode, and a separator interposed between the positive electrode and the negative electrode;
   a container for receiving the electrode assembly; and
   a cap assembly that is coupled with the container;
   wherein the cap assembly comprises: a cap plate that is coupled with the container; an external terminal that is disposed in the cap plate to be coupled with the electrode assembly; and a tubular body that surrounds the external terminal to couple the external terminal to the cap plate,
   wherein the tubular body has a protrusion at an outer circumferential surface spaced apart from the cap plate.

2. The rechargeable battery of claim 1,
   wherein the external terminal has a protrusion at an outer circumferential surface that contacts the tubular body.

3. The rechargeable battery of claim 2,
   wherein the protrusion of the external terminal has a ring shape.

4. The rechargeable battery of claim 1,
   wherein the external terminal is inserted into a through hole that is formed on the cap plate and the tubular body is arranged around the through hole to closely contact the external terminal.

5. The rechargeable battery of claim 4,
   wherein the tubular body is integrally formed with the cap plate.

6. The rechargeable battery of claim 1,
   wherein the planar cross-section of the external terminal and a planar cross-section of the inner space of the tubular body have the same shape.

7. The rechargeable battery of claim 6,
   wherein the tubular body has a cylindrical shape.

8. The rechargeable battery of claim 1,
   wherein a sealing member is interposed between the tubular body and the external terminal.

9. The rechargeable battery of claim 8,
   wherein the sealing member includes a cylindrical gasket that closely contacts an inner circumferential surface of the tubular body.

10. The rechargeable battery of claim 8,
    wherein the sealing member is made of a resin that is injected and cured between the tubular body and the external terminal.

11. The rechargeable battery of claim 9,
    wherein flanges are formed at both ends of the gasket and extend to an upper end of the tubular body and the inner surface of the cap plate.

12. The rechargeable battery of claim 2,
    wherein the cross section of the protrusion of the external terminal along the length direction has a hemispherical shape.

13. The rechargeable battery of claim 2,
    wherein an O-ring is disposed between the external terminal and the tubular body on an outer circumferential surface of the external terminal.

14. The rechargeable battery of claim 1,
    wherein the rechargeable battery has a rectangular box shape.

15. The rechargeable battery of claim 1,
    wherein the rechargeable battery powers a motor driven device.

16. The rechargeable battery of claim 2,
    wherein the protrusion of the external terminal corresponds with the protrusion of the tubular body.

17. The rechargeable battery of claim 1,
    wherein the external terminal comprises a screw thread at a first end and a flange at a second end opposite the first end.

18. The rechargeable battery of claim 17,
    wherein an O-ring is disposed between the protrusion of the tubular body and the screw thread.

* * * * *